United States Patent
Nguyen et al.

(10) Patent No.: US 8,902,171 B2
(45) Date of Patent: Dec. 2, 2014

(54) HOUSING CONFIGURATION FOR ORIENTATING A SURFACE FEATURE ON A MOBILE DEVICE

(75) Inventors: Huy Nguyen, San Jose, CA (US); Tola Chin, Redmond, WA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 10/159,517

(22) Filed: May 31, 2002

(65) Prior Publication Data

US 2003/0222845 A1  Dec. 4, 2003

(51) Int. Cl.
*G06F 3/041* (2006.01)

(52) U.S. Cl.
USPC .......................................... 345/173; 345/156

(58) Field of Classification Search
USPC ......... 345/169, 158, 173; D14/341, 342, 138; D16/208
See application file for complete search history.

(56) References Cited

U.S. PATENT DOCUMENTS

| | | | | |
|---|---|---|---|---|
| D401,577 S | * | 11/1998 | Yamaguchi | D14/138 |
| 5,898,600 A | * | 4/1999 | Isashi | 708/105 |
| 6,069,648 A | * | 5/2000 | Suso et al. | 348/14.02 |
| 6,115,248 A | * | 9/2000 | Canova et al. | 361/686 |
| D435,837 S | * | 1/2001 | Suzuki et al. | D14/138 |
| 6,462,941 B1 | * | 10/2002 | Hulick et al. | 361/683 |
| 6,466,202 B1 | * | 10/2002 | Suso et al. | 345/169 |
| 6,466,203 B2 | * | 10/2002 | Van Ee | 345/173 |
| D473,580 S | * | 4/2003 | Nakahara | D16/208 |
| D477,114 S | * | 7/2003 | Sheng | D28/79 |
| 2001/0046886 A1 | * | 11/2001 | Ishigaki | 455/566 |
| 2002/0140667 A1 | * | 10/2002 | Horiki | 345/156 |
| 2003/0128190 A1 | * | 7/2003 | Wilbrink et al. | 345/169 |

* cited by examiner

*Primary Examiner* — Jason Olson
(74) *Attorney, Agent, or Firm* — Mahamedi Paradice Kreisman LLP

(57) ABSTRACT

A handheld computer has a housing with a front face and a back face. A length of the front face and a length of the back face each extend primarily in a first direction corresponding to a length of the housing. A width of the front face and a width of the back face each extend primarily in a second direction corresponding to a width of the housing. A first surface extends between the front face and the back face. The first surface is acutely angled with respect to at least one of the front face and the back face. A component is disposed at least partially on the front surface. The component is operationally affected by a direction in which the component is oriented.

19 Claims, 3 Drawing Sheets

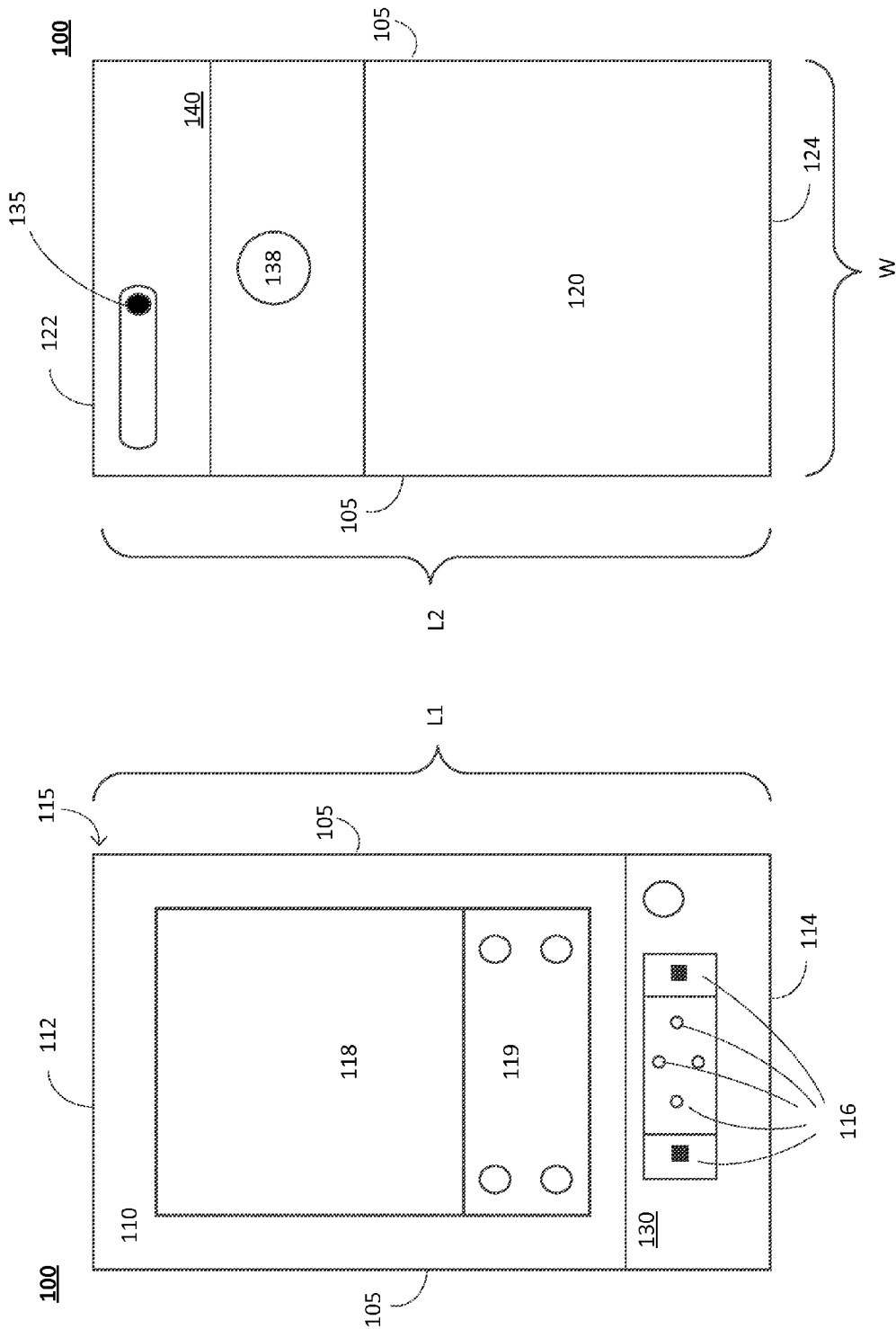

HOUSING CONFIGURATION FOR ORIENTATING A SURFACE FEATURE ON A MOBILE DEVICE

FIELD OF THE INVENTION

The present invention relates to handheld computers. In particular, the present invention relates to a handheld computer having a housing configuration that orients a surface feature.

BACKGROUND OF THE INVENTION

Handheld computers, typically referred to as personal digital assistants (PDAs), are intended to be mobile devices. In general, small sizes are desired for handheld computers to enhance mobility. However, there are constraints to how small a handheld computer can be for convenience of the user. In particular, certain characteristics of handheld computers require a minimum amount of space on the exterior housing of the handheld computer.

Most handheld computers require a minimum size display. The minimum display size is set by balancing considerations such as mobility with the need for the user to view data, such as personal management information, pictures, and text pages. For some handheld computers, the size of the display may also need to be large enough to provide a character input mechanisms for the user. For example, some handheld computers incorporate character recognition logic as a primary means for the user to enter character data into the handheld computer. The displays for the handheld computer may be made to be contact-sensitive. A portion of the display may be combined with logic to provide an immediate character recognizer for recognizing gestures or strokes entered onto a portion of the display as characters. Other displays may be used to display a virtual keyboard. The immediate character recognition regions and virtual keyboards require the displays to be of a minimum size to support those kinds of character entry.

The size of the handheld computer typically must also accommodate mechanical actuators, such as buttons or pivot switches. These are typically placed on the same surface where the display is viewable to enable users to coordinate button actions with what is shown on the display.

As battery and printed circuit board technology becomes more advanced, the display size and mechanical actuators are increasingly becoming the primary factors that determine the size of the handheld computer. Reducing the length of the handheld computer requires sacrificing features of the display and/or buttons.

With technological advancements, handheld computers and devices are increasingly integrating functions that used to be performed by entirely different devices. The small size of the handheld computers are required to accommodate additional hardware components that provide the additional functionalities.

SUMMARY OF THE INVENTION

Embodiments of the invention provide for a handheld computer having a housing that is shaped to orient a surface component on the handheld computer. A slanted surface is provided on the handheld computer that extends between two other primary surfaces of the handheld computer. A surface component that is operationally affected by its orientation direction is provided on the slanted surface. The slanted surface predisposes the surface feature to be oriented in a particular direction when the handheld computer is in use.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

FIG. 1 is a frontal view of a handheld computer configured under an embodiment of the invention.

FIG. 2 is a back view of a handheld computer configured under an embodiment of the invention.

DETAILED DESCRIPTION OF THE INVENTION

Figure 3:
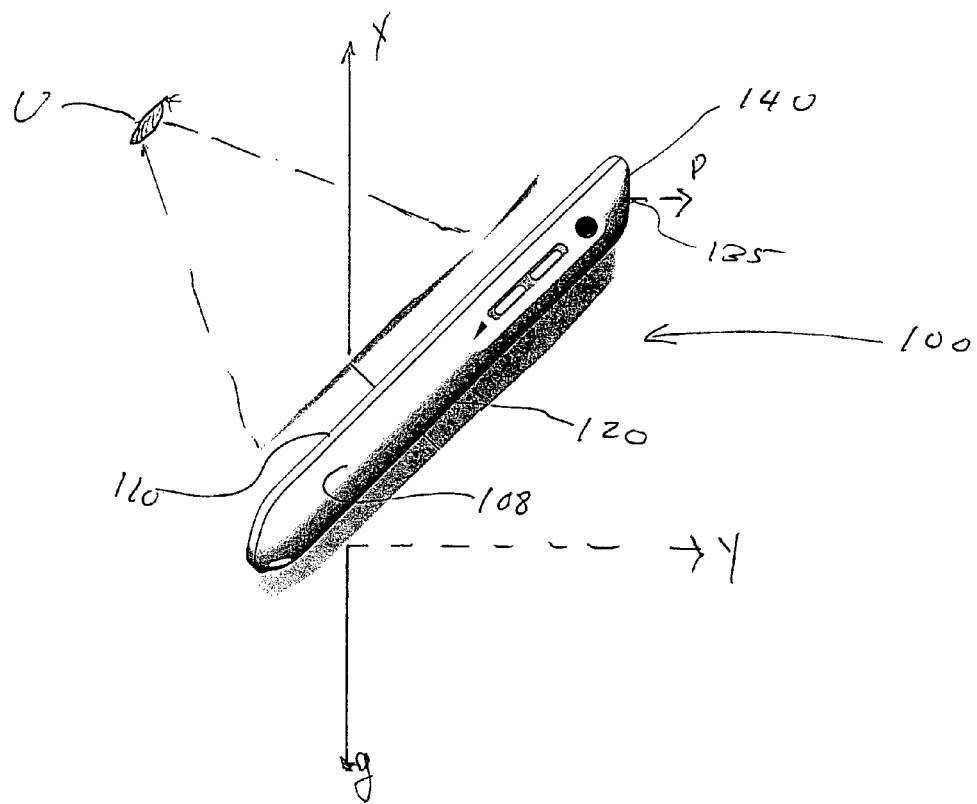
FIG. 3 is a side view of a handheld computer configured under an embodiment of the invention.

Embodiments of the invention describe handheld computer having a housing configuration that orients a surface feature. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

According to an embodiment, a handheld computer has a housing with a front face and a back face. A length of the front face and a length of the back face each extend primarily in a first direction corresponding to a length of the housing. A width of the front face and a width of the back face each extend primarily in a second direction corresponding to a width of the housing. A first surface extends between the front face and the back face. The first surface is acutely angled with respect to at least one of the front face and the back face. A component is disposed at least partially on the front surface. The component is operationally affected by a direction in which the component is oriented.

The term "face" refers to a surface that is substantially planar. A face may be slightly arcuate or curved, but the region of the space extends primarily in the same planar directions.

As used herein, terms "substantial" and "primarily" indicate 90% of a stated quantity or comparison point.

The term "length" refers to a longest dimension of the particular object. The term "width" refers to the next longest dimension of the object.

The expression "operationally affected" means that a direction that the component is directed in affects the output and/or the performance of the component. In one embodiment, a surface component is a lens. The orientation of the lens affects a selection of images that can be captured with the lens.

B. Description Of Housing With Slanted Surface And Directional Component

FIG. 1 is a frontal view of a handheld computer configured under an embodiment of the invention. The handheld device 100 includes a front face 110 providing a display 118. A plurality of buttons 116 or other actuation mechanisms may also be provided below display 118. A housing 115 of handheld computer 100 includes a front face 110. The front face 110 may be referenced by a top end 112, a bottom end 114, and a pair of lateral sides 105. A distance between the top edge 112 and the bottom end 114 defines a length (l1) of handheld computer 100. A distance between lateral sides 105 defines a width of handheld computer 100. The front face 110 is substantially planar, meaning that the length and width of the front face 110 extend primarily along the axes X and Y.

In an embodiment, handheld computer 100 performs operations as a PDA type device. The display 118 may be contact sensitive. An alphanumeric input area 119 may form as or adjacent to a portion of display 118. In the example shown, alphanumeric input area 119 is a handwriting recognition area, such as provided by GRAFFITI in the PALM OS (manufactured by PALM INC.). Other types of handwriting recognition areas include those provided by POCKET PC (manufactured by MICROSOFT CORP.) Other types of alphanumeric input areas include keyboards. The application buttons 116 may be actuated to launch applications, to select input or content appearing on display 118, and to actuate other functions and operations that can be performed by the handheld computer.

Examples of applications that may be launched or otherwise operated by a PDA type device include personal information management (PIM) applications, including calendar applications for maintaining appointments, address book applications for maintaining contact information, to-do applications to maintain lists, and memo applications to allow entries of memos. Other applications that may be used by a PDA type device include word processing applications, graphic applications for jotting illustrations, and spreadsheets. A PDA type device is any device that operates such applications, or that is able to receive alphanumeric input.

In an embodiment, front face 110 is formed or merged into one or more slanted surfaces that extend between the front face and the back face 120 (FIG. 2). A bottom slanted surface 130 is shown in FIG. 2. In an embodiment, bottom slanted surface 130 may unitarily be formed as part of the housing 115 that includes front face 110. In one embodiment, an angle formed between front face 110 and bottom slanted surface 130 ranges between 30 and 60 degrees, and is preferably about 45 degrees. In an embodiment shown, surface features such as buttons 116 are provided entirely on front face 110, although bottom slanted surface 130 may include portions of buttons 116 or other surface features.

FIG. 2 is a back view of a handheld computer configured under an embodiment of the invention. The back face 120 of handheld computer 100 extends substantially parallel to front face 110. The back face 120 may be referenced with respect to a top end 122 and a bottom end 124. A length (l2) of the back face 120 may extend between top end 122 and bottom end 124. The width of back face 120 may extend between lateral sides 105, so as to be the same as front face 110.

A top slanted surface 140 may extend from back face 120 towards front face 110. As with the bottom slanted surface 130, the top slanted surface 140 may be unitarily formed as part of the housing that includes back face 120. In one embodiment, an angle formed between back face 120 and top slanted surface 140 ranges between 30 and 60 degrees, and is preferably about 45 degrees. In another embodiment, the angle may range between 15 and 45 degrees. The top slanted surface 140 may be substantially parallel to the bottom slanted surface 130.

A directional surface feature, such as a hardware component, may be provided on the top slanted surface 140. In an embodiment, the surface feature corresponds to a lens 135. The lens 135 may be used in conjunction with a processor or other internal components of handheld computer 100 in order to capture images. The direction in which lens 135 is directed determines the images that the lens can capture. The lens may be formed by a transmissive layer provided on the top slanted surface 140 surface. A light-detecting material may be provided under the transmissive material of the lens 135.

The back face 120 may have other features as well. For example, an actuation mechanism 138 may be provided for causing the handheld computer 100 to capture an image using lens 135.

FIG. 3 is a side view of the handheld computer configured under an embodiment of the invention. The handheld computer 100 is shown oriented in a direction for use by a user (U). Use of the handheld computer 100 may be made in reference to a vertical axis X, defined by gravity, and a horizontal axis Y. In a configuration such as shown, handheld computer 100 may be tilted when in use relative to the X and Y axes. The user U may view the display 118 (see FIG. 1) provided by front face 110 from an angle. The user's hand may rap around the side surfaces 108 to hold handheld computer 100 in the configuration shown.

In this typical configuration, an embodiment provides that top slanted surface 140 on housing 115 is directed in about the direction of the horizontal. The lens 135 would be pointed in or about direction P. In this way, the user may operate handheld computer 100, in a normal manner while causing the handheld computer 100 to capture images through lens 135.

The actual direction of P does not have to be straight along the horizontal, but may vary. The orientation of stop slanted surface 140 with respect to front face 110 and back face 120 is such that lens 135 may be angled acutely away from the tangential planes to either of the front or back face.

Among other advantages, the user may operate the handheld computer 100 to operate the directional surface component without altering the position of the handheld computer in his or her hand. In addition, the display 118 (FIG. 1) can be maintained in an optimal viewing position for the user. When, for example, the directional component is lens 135, the lens may display captured images to the user on display 118. This may provide the user with an opportunity to view an image before it is stored in memory.

C. Hardware Diagram

Figure 4:
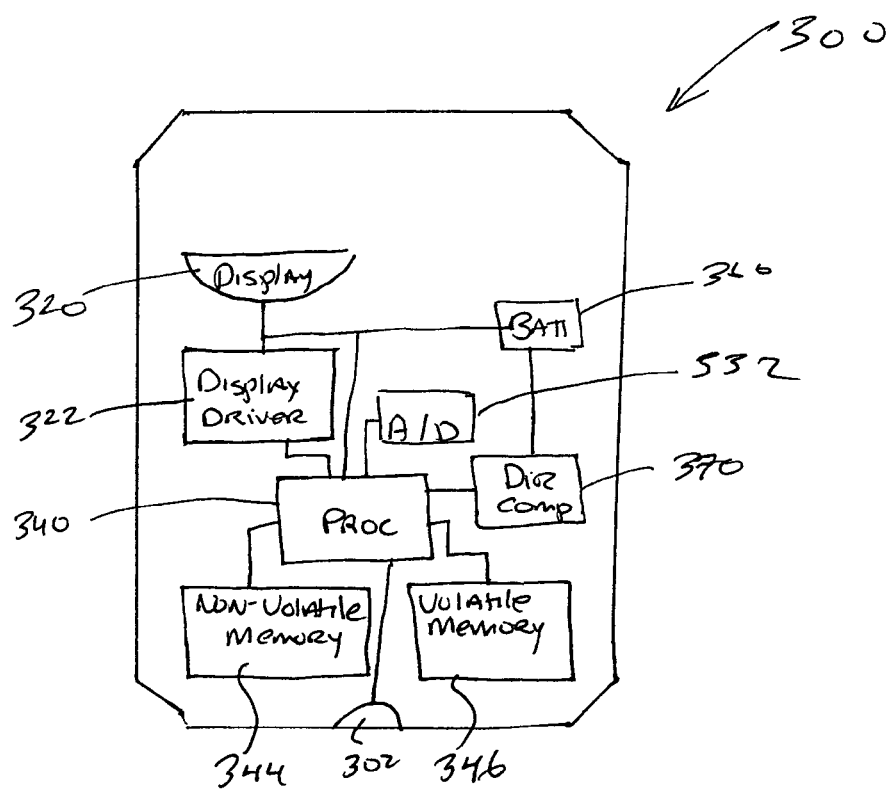
FIG. 4 is a block diagram of a handheld computer for use with an embodiment of the invention.

FIG. 4 is a block diagram of a handheld computer for use with an embodiment of the invention. In an embodiment, a handheld computer 300 includes a processor 340 coupled to a first memory 344 (non-volatile) and a second memory 346 (volatile). The processor 340 is coupled to a display driver 322. The processor 340 combines with display driver 322 to process and signal data for presentation on a display assembly 320. The display assembly 320 includes screen and digitizer.

An analog-digital (AD) converter 332 is coupled to processor 340. One or more channels from A/D converter 332 maybe used to convert analog input provided by the digitizer, or by another analog input mechanism. A battery 360 may power multiple components with handheld computer 300.

A directional component 370 may be communicatable to processor 340. The directional component 370 may correspond to lens 135 (FIG. 1). The directional component 370 may be provided on a slanted surface, such as on top slanted surface 140, extending between front face 110 and back 120, as shown in FIG. 2. Other examples of directional components are provided elsewhere in this application.

The handheld computer 300 may include one or more expansion ports for coupling to accessory devices, such as cradles, modems, memory units, re-chargers and other devices. Examples of expansion ports include serial ports, Universal serial Bus (USB) ports, CompactFlash slots and infra-red ports. In an embodiment shown, a first expansion port 302 enables one or more types of expansion modules to be connected to processor 340.

D. Alternative Embodiments

While embodiments disclosed above describe use of lens 135 as a surface feature on one of the slanted surfaces of handheld computer 100, other embodiments may use other components that are operationally affected by a direction in which that component is oriented. Other examples of surface features that are affected by directional placement include a microphone, a light-beam projecting device, a wireless communication transmitter, and a wireless communication receiver.

While embodiments described with FIGS. 1-4 provide for the front face 110 and back face 120 of handheld computer 100 to be substantially planar, it is possible for the front and back faces to be acutely angled relative to one another. Even when front face 110 and back face 120 are acutely angled, both faces may extend substantially in a lengthwise and widthwise direction of the housing.

According to another embodiment, an accessory device may be positioned on a surface acutely angled to the primary faces of the handheld computer. For example, in FIG. 4, one of the accessory devices coupleable to processor 340 across port 302 may physically be positioned on top slanted surface 140 (FIG. 2).

E. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A mobile device comprising:
   a housing having (i) a front face and a back face, a length of the front face and a length of the back face each extending primarily in a first direction corresponding to a length of the housing, a width of the front face and a width of the back face each extending primarily in a second direction corresponding to a width of the housing, (ii) a top surface being substantially planar and extending between the front face and the back face to form a top edge, the top surface being acutely angled with respect to the front face, and (iii) a bottom surface being substantially planar and extending between the front face and the back face to form a bottom edge, the top surface and the bottom surface being substantially parallel to each other, wherein the housing is structured to be unitary, so that the front face, the back face, the top surface, and the bottom surface are fixed relative to one another and so that the length of the housing is constant;
   a lens component for use in capturing an image of a scene, the component being disposed on the top surface but not on the back face and being operationally affected by a direction in which the lens component is oriented;
   a plurality of input mechanisms provided on the front face, the plurality of input mechanisms including a contact-sensitive display;
   a processor contained with the housing to cause the image of the scene captured by the lens component to be displayed on the display;
   wherein the housing is structured to enable an orientation that, relative to a reference Y that is defined by a direction of gravity and a reference X that is orthogonal to Y, enables (i) an angle in which the display is viewed by a user to be acute with respect to Y, and (ii) a direction in which the lens component is directed to be substantially along X and directed outward away from the user.

2. The mobile device of claim 1, wherein the front face and the back face are substantially parallel to one another.

3. The mobile device of claim 1, wherein a thickness of the mobile device is defined by a distance between the front face and the back face, and wherein the thickness varies over the length of the mobile device.

4. The mobile device of claim 1, wherein the first surface is angled between 15 degrees and 45 degrees from the front face.

5. The mobile device of claim 1, wherein the plurality of input mechanisms provided on the front face includes a button.

6. The mobile device of claim 5, wherein the button is positioned on the front face between the contact-sensitive display and an edge of the front face that meets the bottom surface.

7. The mobile device of claim 1, further comprising a button provided on the back face of the mobile device to enable the mobile device to capture the image of the scene using the lens component.

8. The mobile device of claim 1, wherein the processor enables the user to store the image of the scene captured by the lens component in a memory resource.

9. The mobile device of claim 1, wherein the housing includes a pair of lateral sides, and wherein a set of features are provided on one of the lateral sides.

10. A mobile device comprising:
    a housing having (i) a front face and a back face, a length of the front face and a length of the back face each extending primarily in a first direction corresponding to a length of the housing, a width of the front face and a width of the back face each extending primarily in a second direction corresponding to a width of the housing, (ii) a top surface being substantially planar and extending between the front face and the back face to form a top edge, the top surface being acutely angled with respect to the front face, and (iii) a bottom surface being substantially planar and extending between the front face and the back face to form a bottom edge, the top surface and the bottom surface being substantially parallel to each other, wherein the housing is structured to be unitary, so that the front face, the back face, the top surface, and the bottom surface are fixed relative to one another and so that the length of the housing is constant;
    a display provided on the front face;
    one or more input mechanisms provided on the front face, the one or more input mechanisms being actuatable by a user to provide input;
    a memory resource to store one or more applications;
    a lens component for use in capturing an image of a scene, the lens component being disposed on the first surface but not on the back face;
    a processor to run the one or more applications stored in the memory resource, wherein the processor further causes the image of the scene captured by the lens component to be displayed on the display;
    wherein the housing is structured to enable an orientation that, with reference to a reference Y that is defined by a direction of gravity and a reference X that is orthogonal to Y, enables (i) an angle in which the display is viewed by the user to be acute with respect to Y when the user holds and operates the mobile device, and (ii) a direction in which the lens component is directed to be substantially along X and directed outward away from the user.

11. The mobile device of claim 10, wherein the one or more application includes at least one of a calendar application, a contacts application, a memo application, or a word processing application.

12. The mobile device of claim 10, wherein the front face and the back face are substantially parallel to one another.

13. The mobile device of claim 10, wherein a thickness of the mobile device is defined by a distance between the front face and the back face, and wherein the thickness varies over the length of the mobile device.

14. The mobile device of claim 10, wherein the first surface is angled between 15 degrees and 45 degrees from the front face.

15. The mobile device of claim 10, further comprising one or more ports to connect the mobile device to another device.

16. The mobile device of claim 10, wherein the lens component includes a transmissive layer provided on the first surface.

17. The mobile device of claim 10, further comprising a button provided on the back face of the mobile device to enable the mobile device to capture the image of the scene using the lens component.

18. The mobile device of claim 10, wherein the processor enables the user to store the image of the scene captured by the lens component in a memory resource.

19. The mobile device of claim 10, wherein the housing includes a pair of lateral sides, and wherein a set of features are provided on one of the lateral sides.

\* \* \* \* \*